Oct. 28, 1969   D. M. KRAWIEC   3,475,273
NUCLEAR REACTOR FUEL ASSEMBLY
Filed Dec. 5, 1967
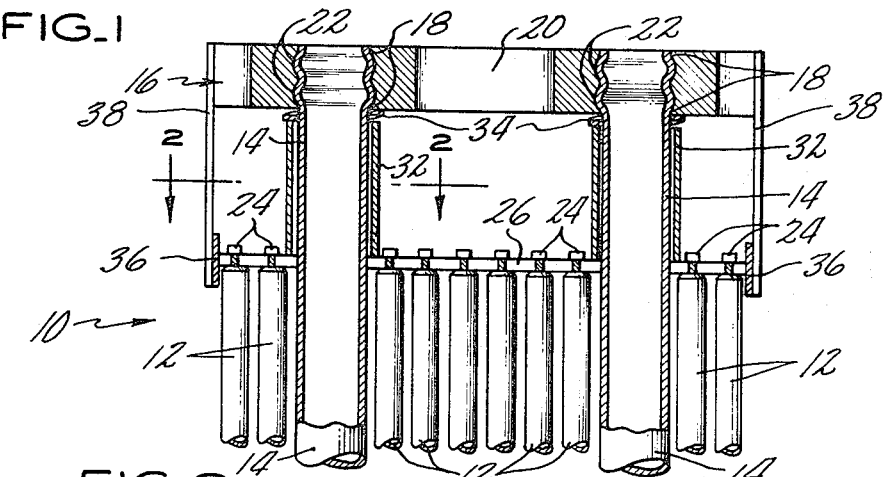
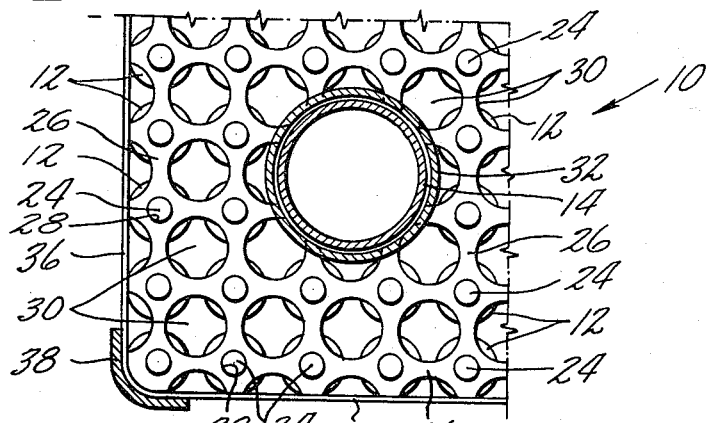
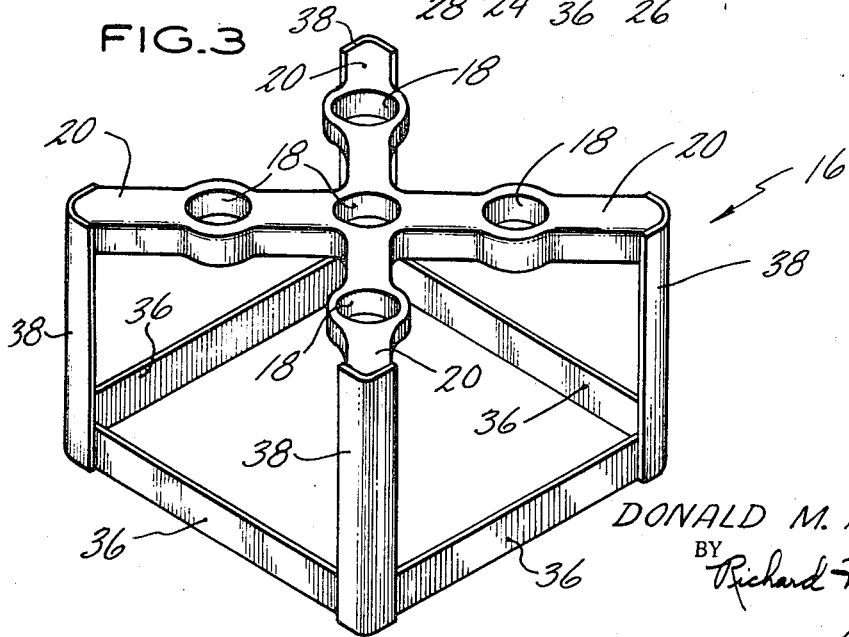
INVENTOR.
DONALD M. KRAWIEC
BY Richard H. Berneike
ATTORNEY United States Patent Office 3,475,273
Patented Oct. 28, 1969

3,475,273
NUCLEAR REACTOR FUEL ASSEMBLY
Donald M. Krawiec, Thompsonville, Conn., assignor to Combustion Engineering, Inc., Windsor, Conn., a corporation of Delaware
Filed Dec. 5, 1967, Ser. No. 688,098
Int. Cl. G21b 3/30
U.S. Cl. 176—78           7 Claims

ABSTRACT OF THE DISCLOSURE

Nuclear reactor fuel element assemblies including a flexible retaining plate with perforations which fit over pins extending up from the fuel elements to position the fuel elements and with perforations for coolant flow up through the plate. The plate flexes to permit uneqaul thermal expansion of the fuel elements. Springs hold the plate down on the fuel elements and permit the entire plate to flex and move vertically as required during temperature changes.

Background of the invention

It is well known that the fuel or fissionable material for heterogeneous nuclear reactors is conventionally contained in a number of thin-walled tubes forming elongated fuel elements which may be grouped and joined together into fuel element assemblies. Each reactor has a number of such fuel assemblies therein comprising the reactor core. The design of the fuel element assemblies and particularly the technique for supporting the fuel elements in the assemblies produce some unique problems. One significant problem is caused by the varying neutron flux distribution across a fuel assembly which causes the fuel elements in one portion of the assembly to be at a higher temperature than those in another portion. Such a situation will result in the unequal thermal expansion in the longitudinal direction of the individual fuel elements within a single fuel assembly. This unequal expansion should be unrestrained in order to prevent the creation of excessive stresses in the individual fuel elements and in the fuel assemblies as a whole and the resultant bowing of the elements.

The fuel elements are conventionally arranged in a spaced array in the fuel assemblies between end support fittings with additional supporting grid structures intermediately spaced between the ends. The present invention deals particularly with the means for supporting the upper ends of the fuel elements in proper alignment and for holding the fuel elements down in the assembly and yet permitting the above-mentioned unequal thermal expansion. The present invention is particularly adapted for use with fuel assemblies as illustrated and described in the U.S. patent applications of Royce J. Rickert, Ser. No. 632,509, filed Apr. 14, 1967, and Paul C. Zmola et al., Ser. No. 630,986, also filed Apr. 14, 1967. The fuel element assemblies described in these patent applications have a number of fuel elements removed from the assembly and replaced with control element guide tubes which extend throughout the length of the fuel assemblies and extend above the upper ends of the fuel elements. A typical and preferred arrangement involves a guide tube extending down through the center of each of the fuel assemblies with four additional guide tubes equally spaced around the central guide tube and generally near the corners of the fuel assembly. These guide tubes are adapted to accept the fingers of a control element assembly, with each control element assembly having five control rod fingers corresponding to the five guide tubes in the fuel assembly.

It has been customary in the prior art to secure fuel elements in the fuel assemblies by means of some attaching means at the lower ends of the fuel elements which tie the fuel elements down to the lower end fitting. One such means is studs attached to the fuel elements which extend down through the lower end fitting and which have nuts placed thereon. This requires that the nuts be tightened to the proper torque and can create problems due to the thermal expansion of the components during reactor operation. Another scheme for attaching the fuel elements at the lower end fitting involves welding, but this too has its drawback particularly due to the distortion of the lower end fitting during the welding operations. To eliminate these problems, the present invention provides a novel means for both positioning the upper ends of the fuel elements and for holding them down within the assemblies without the need for fastening them down to the lower end fitting.

Summary of the invention

In accordance with the present invention, a relatively flexible retaining plate adapted to position the upper ends of the fuel elements and having apertures therethrough for coolant flow is placed over the tops of the fuel elements within each assembly. The plate flexes to permit the unequal thermal expansion of the fuel elements but yet maintains sufficient downward pressure upon the fuel elements to hold them in position in the assembly. The retaining plate may be held down against the fuel elements by reflexible means which permit the flexure of the plate and the general vertical movement of the retaining plate during temperature changes. The invention also provides a simplified construction for the upper ends of the fuel assemblies.

Brief description of the drawings

FIGURE 1 is a cross-section view of the upper portion of a fuel assembly of the present invention;
FIGURE 2 is a section view taken along line 2—2 of FIGURE 1; and
FIGURE 3 is an isometric view of the upper end fitting assembly.

Description of the preferred embodiment

Referring first to FIGURE 1 there is illustrated the upper end of a fuel element assembly 10 which contains a plurality of fuel elements 12. These fuel elements are cenventionally elongated tubes which are filled with fissionable material such as sintered $UO_2$ pellets. These fuel elements would extend downwardly to a lower end fitting plate and be positioned relative thereto such as by pins extending from the lower ends of the fuel elements into corresponding holes in the lower end fitting. The fuel elements are normally arranged in a square array in the fuel assembly although the invention is not limited to any particular configuration. The illustrated fuel assembly comprises a 14 by 14 array of fuel elements although it is obvious that the number of fuel elements in each assembly can also be varied.

Extending downwardly through the fuel assemblies are the control element guide tubes 14. Each of these guide tubes displaces four fuel elements from the assembly as indicated in FIGURE 2. There are five such guide tubes within each fuel assembly with one being located in the center and with the other four being located near the corners of the fuel element assemblies. FIGURE 2 illustrates one such corner guide tube and the surrounding fuel elements. These guide tubes extend upwardly above the upper ends of the fuel elements as illustrated in FIGURE 1 and are attached to the upper end fitting assembly 16 which is illustrated in detail in FIGURE 3. The upper ends of the guide tubes 14 extend into the holes 18 in the locating arm 20 of the upper end fitting assembly 16. These holes 18 have recesses 22 therein as illustrated in FIGURE 1 and the upper ends of the guide tubes 18 are expanded to conform to the shape of the opening 18 and the recesses 22 to fix the guide tubes with respect to the locating arm. The guide tubes are also attached to the lower end fitting plate to tie the fuel assemblies together.

The upper ends of the fuel elements 12 have pins 24 extending therefrom. The retaining plate 26 has openings 28 therein which fit over the pins 24 to maintain the tops of the fuel elements in proper alignment. The retaining plate 26 also has openings 30 therein for coolant flow. These latter openings are of a relatively large size so as to minimize the flow restricting effect of the retaining plate. Openings are also formed in the retaining plate 26 for the guide tubes 14 to pass through.

In order to force the retaining plate 26 downwardly against the fuel elements, a retaining sleeve 32 is placed around each of the guide tubes 14 between the retaining plate 26 and the locating arm 20. Springs 34 are placed between the upper ends of the retaining sleeves 32 and the locating arm 20 so as to force the retaining sleeves downwardly against the retaining plate 26 to hold the retaining plate and thus the fuel elements in position. The springs also permit the retaining plate 26 and the sleeves 32 to move upwardly against the force of the springs to allow for the overall differential thermal expansion of the fuel elements relative to the guide tubes. The springs, for example, may be three-wave spring washers. The openings cut through the retaining plate 26 to accommodate the guide tubes 14 are just large enough for the guide tubes 14 to fit therethrough and small enough such that the retaining sleeve will overlie portions of the retaining plate.

In order to further maintain the proper alignment of the upper end fitting and of the upper ends of the fuel elements, a perimeter strip 36 surrounds the upper ends of the fuel elements 12 and the retaining plate 26. This perimeter strip forms a part of the upper end fitting assembly 16 and is suspended from the locating arm 20 by means of the corner brackets 38. Although it is not necessary, the outer edges of the retaining plate 26 may be affixed to the perimeter strip 36 such as by welding. The upper end fitting assembly 16 can be welded together as a separate unit prior to assembly on the fuel element assembly thus eliminating costly welding procedures which would be necessary when welding on the assembled unit. In practice, the fuel elements and the control element guide tubes would be arranged in the proper array and pinned or otherwise located with respect to the lower end fitting. The retaining plate 26 would then be placed over the guide tubes 14 and pins 24 on the upper ends of the fuel elements. The retaining sleeves 32 and the springs 34 would then be placed over the guide tubes 14. Then the upper end fitting assembly 16 would be placed over the guide tubes 14 into the proper position after which the upper ends of the guide tubes 14 would be rolled into the openings 18 and the recesses 22 to complete the assembly.

While I have illustrated and described a preferred embodiment of my invention, it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

I claim:

1. A nuclear reactor fuel assembly comprising a plurality of generally parallel fuel elements supported in said assembly, a retaining plate adjacent one end of said fuel elements, said retaining plate being relatively thin and flexible whereby said retaining plate will flex upon the unequal expansion of said fuel elements, means holding the ends of said fuel elements adjacent said retaining plate in position relative to each other and to said retaining plate, a tube extending through said fuel assembly parallel to said fuel elements and extending beyond said one end of said fuel assembly and through said retaining plate, and means holding said retaining plate in position.

2. A nuclear reactor fuel assembly as recited in claim 1 wherein said means holding said retaining plate in position includes resilient means.

3. A nuclear reactor fuel assembly as recited in claim 2 wherein said means holding the ends of said fuel elements in position comprises pins extending from the ends of said fuel elements into apertures in said retaining plate and wherein said retaining plate further includes apertures therethrough to permit the flow of reactor coolant therethrough.

4. A nuclear reactor fuel assembly as recited in claim 3 and further including means spaced from said retaining plate on the side remote from said fuel elements and attached to said tube and wherein said means holding said retaining plate in position includes a sleeve surrounding and slideable on said tube between said retaining plate and said means attached to said tube and wherein said resilient means comprises a spring between said sleeve and said means attached to said tube forcing said sleeve against said retaining plate.

5. A nuclear reactor fuel assembly as recited in claim 4 and further including additional tubes extending through said fuel assembly and through said retaining plate wherein said means attached to said tube is attached to said additional tubes and further including additional sleeves on said additional tubes and additional springs acting on said additional sleeves.

6. A nuclear reactor fuel assembly as recited in claim 5 wherein said means attached to said tubes comprises means for lifting said fuel assembly.

7. A nuclear reactor fuel assembly comprising a plurality of parallel and co-extensive fuel elements, a retaining plate adjacent one end of said fuel elements, said retaining plate being relatively thin and flexible whereby said retaining plate will flex upon the unequal thermal expansion of said fuel elements, said retaining plate including a plurality of first apertures therein adjacent said one end of said fuel elements, mounting pins attached to said one end of said fuel elements and extending into said first apertures in said retaining plate to hold said fuel elements in position, said retaining plate further including second apertures therethrough to permit the flow of reactor coolant therethrough and at least one third aperture therethrough, at least one tube extending through said fuel assembly parallel to said fuel elements and extending beyond said one end of said fuel elements through said third aperture in said retaining plate, means spaced from the side of said retaining plate remote from said fuel elements, said tube being attached to said means, a sleeve located around said tube between said means and said retaining plate, said sleeve abutting a portion of said retaining plate, a spring between said means and said sleeve to force said sleeve against said retaining plate to hold said retaining plate in position against said fuel elements.

References Cited

UNITED STATES PATENTS

| | | | |
|---|---|---|---|
| 3,314,859 | 4/1967 | Anthony | 176—50 |
| 3,321,373 | 5/1967 | Challender | 176—86 X |
| 3,346,459 | 10/1967 | Prince et al. | 176—61 X |
| 3,375,172 | 3/1968 | Mansson et al. | 176—78 |

CARL D. QUARFORTH, Primary Examiner

M. J. SCOLNICK, Assistant Examiner

U.S. Cl. X.R.

176—87